United States Patent [19]
Anders et al.

[11] Patent Number: 6,005,024
[45] Date of Patent: *Dec. 21, 1999

[54] PHOSPHORESCENT EPOXY OVERLAY

[76] Inventors: Irving Anders; Bruce Anders, both of P.O. Box 546, Bethel, Ak. 99559

[ * ] Notice: This patent is subject to a terminal disclaimer.

[21] Appl. No.: 09/004,163

[22] Filed: Jan. 6, 1998

Related U.S. Application Data

[63] Continuation-in-part of application No. 08/548,229, Oct. 25, 1995, Pat. No. 5,665,973, which is a continuation-in-part of application No. 08/257,350, Jun. 9, 1994, Pat. No. 5,472,737.

[51] Int. Cl.$^6$ ............... C09K 11/02; C09K 11/08; C09K 3/22; C09L 63/00
[52] U.S. Cl. ............ 523/172; 523/400; 523/457; 523/460; 524/403; 524/408; 524/413; 524/436; 524/437; 252/301.36; 252/301.4 R
[58] Field of Search ............... 523/400, 457, 523/460, 172; 252/301.36, 301.4 R; 524/403, 408, 413, 436, 437

[56] References Cited

U.S. PATENT DOCUMENTS

| | | | |
|---|---|---|---|
| 4,208,300 | 6/1980 | Gravisse | 252/301.36 |
| 4,522,861 | 6/1985 | Dunsworth | 523/400 |
| 5,395,673 | 3/1995 | Hunt | 428/148 |
| 5,424,006 | 6/1995 | Murayama et al. | 252/301.4 R |
| 5,474,194 | 12/1995 | Heilman et al. | 428/209 |
| 5,686,022 | 11/1997 | Murayama et al. | 252/301.4 R |

Primary Examiner—Peter A. Szekely

[57] ABSTRACT

The present invention pertains to novel durable, tough, transparent, luminescent overlay compositions, useful for highlighting and/or illuminating and preserving surfaces and markings thereupon, such as roadways/highways, pedestrian passageways, airport runways, traffic control surface markings on travelways such as those listed above, traffic control devices/signs, structures, and articles. The clear compositions contain a moisture sensitive luminescent substance (for example, a phosphorescent substance having increased brightness and longer lasting afterglow) and an epoxy resin which imparts moisture stability to the luminescent substance, and durability and longer life to the underlying markings, surface area, structure or article. The clear transparent compositions can be applied as an overlay to existing surface area markings, or to unmarked surface areas themselves, or to structures or articles without obscuring the original appearance or color of the marking/surface/structure/article, to cover and/or protect the marking/surface/structure/article for an extended period of time, while providing indoor and outdoor luminescence on the marking/surface/structure/article in dark conditions for increased safety. The overlay compositions provide these benefits in an environmentally friendly manner because the compositions do not contaminate the surrounding environment with any organic hydrocarbon products via vaporization or runoffs, and in addition, may decrease the necessity to illuminate surface markings by energy-consuming overhead electrical fixtures.

13 Claims, No Drawings

PHOSPHORESCENT EPOXY OVERLAY

RELATED PATENT APPLICATIONS

The present invention is a continuation-in-part of Ser. No. 08/548,229, filed Oct. 25, 1995, issued as U.S. Pat. No. 5,665,793 issued Sep. 9, 1997 to Irving Anders, "Phosphorescent Highway Paint Composition", which in turn was a continuation-in-part of Ser. No. 08/257,350, filed on Jan. 9, 1994, issued as U.S. Pat. No. 5,472,737 issued Dec. 5, 1995 to Irving Anders, "Phosphorescent Highway Paint Composition".

FIELD OF THE INVENTION

The present invention pertains to novel durable, tough, transparent, luminescent overlay compositions, useful for highlighting and/or illuminating and preserving surfaces and markings thereupon, such as roadways/highways, pedestrian passageways, airport runways, traffic control surface markings on travelways such as those listed above, traffic control devices/signs, structures, and articles. The clear compositions contain a moisture sensitive luminescent substance (for example, a phosphorescent substance having increased brightness and longer lasting afterglow) and an epoxy resin which imparts moisture stability to the luminescent substance, and durability and longer life to the underlying markings, surface area, structure or article. The clear transparent compositions can be applied as an overlay to existing surface area markings, or to unmarked surface areas themselves, or to structures or articles without obscuring the original appearance or color of the marking/surface/structure/article, to cover and/or protect the marking/surface/structure/article for an extended period of time, while providing indoor and outdoor luminescence on the marking/surface/structure/article in dark conditions for increased safety. The overlay compositions provide these benefits in an environmentally friendly manner because the compositions do not contaminate the surrounding environment with any organic hydrocarbon products via vaporization or runoffs, and in addition, may decrease the necessity to illuminate surface markings by energy-consuming overhead electrical fixtures.

BACKGROUND OF THE INVENTION

It is presently desirable to produce a resilient, transparent epoxy overlay to existing surface area markings, or to surface areas, structures, or articles, that will provide indoor and outdoor luminescent marking materials, and whose compositions do not require organic solvents with vapors that are undesirable when released into the atmosphere and contaminate the surrounding air, land, or water near roadway surfaces via runoffs. U.S. Pat. No. 4,172,063 discloses an abrasion resistant reflective marking composition containing cement, a fluorescent pigment, silica, glass fibers and a filming bonding acrylic polymer agent. The composition of U.S. Pat. No. 4,172,063 cannot, however, be applied as a clear overlay to protect existing surface markings or unmarked areas, nor does it exhibit a sustained lasting afterglow or extended durability or weatherability, nor is it environmentally friendly.

The terms "luminescence" and "luminescent" as used in this specification and in the appended claims is meant to be that property of a material which causes visible light to be continued to be emitted after an exciting light source has been removed as well as that property of a material to glow under a source of light of low visibility and suitable wavelength. U.S. Pat. Nos. 223,050; 274,415; 1,407,534; and 1,637,963 disclose the use of luminous (phosphorescent) compositions in paint, enamels, and as a coloring in paper. These luminous or phosphorescent materials exhibit reduced or degraded light resistance over time. A paint mixture with an acrylic vehicle but having an alkaline earth phosphor other than zinc sulfide, which could be modified by replacing its alkaline earth phosphor with zinc sulfide to obtain a preferred phosphorescent paint is described in U.S. Pat. No. 2,436,182.

As is well-known, fluorescent materials, when excited by a source of light, produce an emission of light. Such materials can be selected to provide a daytime coloration which will demarcate and emphasize areas to be marked, such as: edges of steps, corners of walls, highway edges/lanes/directional markings, median traffic divider stripes, airport runway markings, or buildings outlines. The light emission from these fluorescent materials, however, ceases immediately when the light source is removed.

Phosphorescent materials on the other hand, once they have been excited, remain luminous with a soft, slowly decaying emission or radiation. Such phosphorescent materials can generate a useful level of luminous flux for up to 10 to 12 hours after being activated when exposed to sunlight or artificial light (such as from headlights of automobiles). After an initial exposure to a light source, luminescence can be renewed by once again exposing the materials to either a natural or an artificial light. Thus, highway paints have incorporated fluorescent or phosphorescent substances to demarcate the edges of highways and the median line of the highway to differentiate the different directions of the highway vehicles. Previously, phosphorescent containing highway materials tended to lose their luminescence through chemical attack by the atmosphere (ultraviolet radiation and/or presence of moisture) on the phosphor. In such outdoor uses, the luminescent compositions lost most of their phosphorescence capacity in a matter of days.

U.S. Pat. No. 5,424,006 disclosures phosphorescent phosphors which can be utilized both indoors and outdoors as a nighttime display and show extremely long afterglow characteristics. However, these phosphorescent phosphors must be incorporated into chemical hydrocarbon solvent based systems as they are adversely affected by moisture or aqueous systems. This reference is incorporated by reference in its entirety.

U.S. Pat. No. 5,665,793, "Phosphorescent Highway Paint Composition" provides a long duration of afterglow for indoor and outdoor luminescent marking materials whose compositions do not require organic solvents. The compositions disclosed in U.S. Pat. No. 5,665,793, however, are designed to be used as the marking materials themselves. Further, the compositions disclosed in U.S. Pat. No. 5,665,793 experience a decreased luminosity within the compound due to the paint particles partially blocking the luminous elements. Also, the composition comprises a greater number of components to be mixed than does the epoxy overlay compositions, making mixing more complicated. The present invention, therefore, provides both a protective overlay coating for surfaces, markings on surfaces, structures, or articles, and adds a luminescent element that will illuminate the markings/surfaces/structures/articles under dark conditions or non-daylight hours.

All of the above-cited references are incorporated herein by reference.

SUMMARY OF THE INVENTION

Many areas of travel or activity require markings to delineate such controls as direction, boundary, regulation, and warning, to include: pedestrian passageways; physical boundaries of structures and walls; highway edges, lanes, directional markings, median divider stripes; airport runway markings, or parking area markings. Many of these or other indoor or outdoor areas or passages are currently delineated with painted or adhered markings. Such markings are subject to erosion, decay, disintegration, or weakening due to human or natural elemental degradation. Users of these marked areas would benefit by an application to the areas of a strong, resilient, protective, sealing layer of an overcoating or transparent/transluscent epoxy overlay, thereby insulating the markings from human, vehicular, and/or elemental degradation.

Further, many such markings, even when reflective elements are included within, cease to be visible in darkness or during non-daylight hours. The visibility and durability of such markings/surfaces/structures/articles could be greatly enhanced by being covered with a substance that illuminates and/or "highlights," for a suitably long duration and with a high, intense afterglow, luminescence, so that the markings are visible during the duration of non-daylight hours. This luminescence would also benefit areas that are not actually marked, but that would enable persons to better see the area in darkness, such as on pedestrian passageways, physical boundaries of structures and walls, highway edges, lanes, airport runways or tunnels.

The term "highlight" is used above to connote the characteristic whereby the existing markings or surface to which the overlay composition is applied are not visually obscured by the overlay. This is because the composition, after it is applied to a surface, is virtually clear, making it almost invisible in lighted or daylight conditions. During dark or non-daylight conditions, however, the overlay composition "highlights," with a luminescent glow, the otherwise visually unaffected surface.

Environmentally friendly and energy saving water-based highway marking materials can be produced which have the desired characteristics of ease of application, short track time, suitable long duration and higher intensity of afterglow luminescence as well as the most desired characteristic of extended service wear time under traffic conditions even when subjected to the detrimental factors of ultraviolet radiation and/or moisture.

These same beneficial properties of the overlay compositions described above can also be applied to existing structures and articles, such as buildings and structures on buildings, or articles such as traffic and maintenance equipment or sporting goods. Many solid objects would benefit by having the simultaneous characteristics of protection from human or elemental degradation, and dark or non-daylight visibility, by having the present invention, a transparent/transluscent phosphorescent epoxy overlay composition, applied to the structure or article.

The present invention achieves the above objects, among others, by providing transparent, moisture-sensitive luminescent compositions, such as a phosphorescent phosphor or a combination of a phosphorescent phosphor and a fluorescent material and a epoxy resin which is water insensitive, that would be suitable for overlaying existing markings on travelways and travel areas (or areas not already demarcated that would benefit from nighttime illumination), and that would protect and seal the application markings/areas. When one component of the epoxy resin is pre-mixed with the water sensitive luminescent substance, and this pre-mixture is in turn admixed with the remaining epoxy component (as described more fully below), the resulting mixture protects the enclosed/encapsulated luminescent substance from being attacked by the moisture in the air and the water in a water-based paint composition. Thus, the luminescent substance is protected by the epoxy resin in the compositions after being mixed therewith.

A luminescent (phosphorescent) overlay composition should have the following characteristics: transparent/transluscent, luminescent, possessing an optimally long duration of afterglow luminescence, easy to apply, practically acceptable track time, wearable for an optimally long period of time, stable to moisture, and environmental friendly.

Accordingly, it is a principal object of the present invention to provide a transparent composition that is suitable for use to overlay and protect/preserve surfaces and markings thereupon, such as roadways/highways, pedestrian passageways, airport runways, traffic control surface markings on travelways such as those listed above, traffic control devices/signs, structures, and articles, where it would be preferable to highlight and/or illuminate these areas/markings/structures/articles under dark or non-daylight conditions, that is environmentally protective, exhibits long duration afterglow luminescence and has increased outdoor surface life and durability, and is stable to the detrimental effects of moisture and ultraviolet radiation.

Other objects of the present invention, as well as particular features, elements, and advantages thereof, will be elucidated in, or be apparent from, the following description of the invention.

DESCRIPTION OF THE PREFERRED EMBODIMENT

In a preferred embodiment, the overlay compound is formed by first mechanically premixing either the hardener or polymer component of the epoxy with the luminescent/phosphorescent substance in incremental amounts, until thoroughly, evenly mixed. This "premixing" procedure, i.e., mixing the luminescent phosphorescent substance to one component of the epoxy before mixing together the two epoxy components, allows the epoxy component to thoroughly coat the luminescent powder particles, and permits even, thorough, homogeneous distribution of the luminescent particles within the epoxy component under industrial conditions. At the time of application, the pre-mixture may then be thoroughly mixed with the remaining epoxy component, assuring a homogenous distribution of the particles within the epoxy composition. The resulting composition may then be applied directly to the surface to be overlaid, before the epoxy cures.

Ideally, the surface of the pavement, roadway, structure, or other application area is prepared to receive the overlay compound by being swept clean and then air blasted to remove dirt and other residues thereon. This surface preparation process, however, can be executed in the same form and manner as is performed using existing state-of-the-art techniques for preparing airport, roadway, or other travelway surfaces to receive conventional markings.

When applying the overlay compositions to airport, roadway, or other such travelway surfaces, the techniques and equipment necessary to apply the overlay is the same state-of-the-art techniques and equipment currently used to apply conventional markings to such surfaces, involving, e.g., equipment that is maneuverable to the extent that straight lines can be followed and normal curves can be made in a true arc. One such technique for application of epoxy resins to surfaces is that used by Transpo Inductries, Inc., of New Rochelle, N.Y. in applying Transpo's Polymer Concrete Material Systems (literature attached). This literature is incorporated herein by reference. Other accessories can be utilized which allow for marking legends, symbols, crosswalks, and other special patterns. This equipment is normally truck mounted to provide a self-contained pavement marking machine to apply the composition of the present invention and other desired topical reflective materials such as glass spheres in continuous and skip-line patterns. During application of the water-based luminescent overlay compositions of the present invention, the surface temperature of the roadway should be about 50° F. or higher.

After applying a composition containing this novel composition to a surface, structure or article, upon setting, the composition imparts wearability to the surface such as resistance to surface wear by tires of motor vehicles, airplanes, foot traffic, human handling/use, or elemental effects, such as the oxidizing acidic/basic action and humidity of the atmosphere and moisture, and thus provides an extended surface life. Thus, for example, existing highway or roadway marking materials both in the path of traffic, as well as those marking patterns located out of the general path of traffic (e.g. New York State, Manual of Uniform Traffic Control Devices [MUTCD]), can be covered with the transparent or translucent compositions, which does not affect the markings' daytime appearance, but provides a resilient protective layer for the marking, and which makes the marking luminescent in dark conditions or non-daylight hours.

The overlay compositions of the present invention may also be used in marking any accepting surfaces on which luminescence is desired. For example, the compositions may be used to mark entire airport runways, highways and other roadways, pedestrian travelways, entire buildings/structures, or articles.

The luminescent substance in the compositions of the invention may be either a moisture sensitive phosphorescent substance such as a phosphorescent phosphor oxide type or a combination of a phosphorescent and a fluorescent substance. The preferred luminescent substance, but not limited to this particular phosphorescent pigment, contains phosphorescent phosphors which exhibit extremely long duration of afterglow such as for example those phosphorescent phosphors (disclosed in U.S. Pat. No. 5,424,006), which comprise a compound expressed by the matrix $MAl_2O_4$, in which M is at least one metal element selected from the group consisting of calcium, strontium and barium or alternatively, is a matrix $MAl_2O_4$, in which M is a plurality of metal elements comprised of magnesium and at least one element selected from the group consisting of calcium, strontium and barium. In a preferred form, 0.001 mol % to 10 mol % of europium may be added to the matrix as an activator, where the mol % is relative to the metal element expressed by M. In another preferred form, 0.001 mol % to 10 mol % of at least one element selected from a group consisting of lanthanum, cerium, praseodymium, neodymium, samarium, gadolinium, terbium, dysprosium, holmium, erbium, thulium, ytterbium, lutetium, manganese, tin and bismuth may be doped to the matrix expressed by $MAl_2O_4$ as a coactivator in terms of mol % relative to the metal element expressed by M. One such product is the phosphorescent phosphors commercially available under the trademark LumiNova®, distributed in the United States by United Mineral and Chemical Corporation. (LumiNova® is a registered trademark. Technical literature can be obtained from United Mineral and Chemical Corporation, Dec. 11, 1995. This publication (attached), and the aforesaid U.S. patent are incorporated herein by reference.

When the luminescent compositions include a combination of a phosphorescent and a fluorescent material, the fluorescent material present in the luminescent substance produces a daytime luminescence or reflectivity or coloration in addition to the phosphorescence produced at night.

Optionally, a particulate may be used either topically, or integrated within, to impart abrasiveness to the compositions and is either a natural abrasive material such as fine sand, silica, ground marble (white marble preferred), corundum (aluminum oxide, emery), pumice, iron oxide and feldspar. The more important synthetic types are silicon carbide, boron carbide, cerium oxide and fused alumina; or even some reflective substances (for example crushed reflective glass) as long as they will impart an effective abrasiveness to the surface of the dried paint. This abrasiveness reduces the likelihood of skidding by motor vehicles both in clear weather as well as when the surface of the road is slick, such as from wetness, or vehicular lubricants. In a most preferred embodiment, the ratio of parts of luminescent substance to epoxy resin to particulate should provide a result where the epoxy binds with maximum achievable strength to its attached surface, the luminescent substance provides the maximum achievable intensity and duration of glow, and the additive amount provides a maximum achievable abrasiveness.

The ideal ratio of luminescent substance to epoxy resin depends upon the intended use. As the ratio of parts of luminescent substance to epoxy resin increases, the intensity and duration of glow increases, but adequate particulate covering, bonding, binding, and overall strength decreases. Conversely, as the ratio of parts of epoxy resin to luminescent substance increases, the intensity and duration of glow decreases, but adequate particulate covering bonding, binding, and overall strength increases. Thus, in a preferred embodiment, the ratio of parts of luminescent substance to epoxy resin should provide a result where the epoxy fully encapsulates the luminescent substances particles, and binds with sufficient strength to its attached surface, and protects the overlayed surface/marking with sufficient strength, and the luminescent substance provides sufficient intensity and duration of glow. In a most preferred embodiment, the ratio of parts of luminescent substance to epoxy resin should provide a result where the epoxy binds with maximum strength to its attached surface, and protects the overlayed surface/marking with maximum strength, and the luminescent substance provides maximum intensity and duration of glow.

Therefore, the most preferred embodiment will vary, depending upon the preferred or intended use. Where the intensity and duration of glow is more important than protecting strength (as in, say, an indoor area recieving little direct vehicular or foot traffic), then the ratio of parts of luminescent substance to epoxy resin would be relatively high. Where the intensity and duration of glow is less important than binding, bonding, and protecting strength (as in say, using the the overlay to protect and illuminate an airport runway that is exposed to constant elemental degradation and high vehicular contact), the ratio of parts of epoxy resin to luminescent substance would be relatively higher.

The following examples demonstrate the varying degrees of effectiveness of the combinations of epoxy resin to luminescent substance, wherefrom, depending upon the intended or preferred use of the luminescent overlay composition, the most preferred embodiment can be determined.

EXAMPLE 1

A transparent/transluscent overlay composition was produced from the following ingredients, in the following ratio, by volume:

1 part powdered 80/20 LumiNova® phosphorescent/
fluorescent material;

6 parts epoxy hardener*; and 13 parts epoxy polymer*.

* Materials furnished by Transpo Industries, Inc. of New Rochelle, N.Y.

As described above, the luminescent phosphorescent substance was premixed with either the hardener or polymer, to allow the epoxy component to thoroughly coat the luminescent powder particles, assuring a homogenous distribution of the particles within the epoxy component. The pre-mixture was then mixed with the remaining epoxy component immediately prior to application of the overlay composition to the intended test surface. All ingredients were mixed together at ambient temperature. This procedure was used and followed in all examples provided in this application.

Once the missing epoxy component was added to the pre-mixture, the resulting composition cured in approximately 30-minutes. The cured, applied composition exhibited a fair glow, with approximately 10 to 12 hours of visibile luminescence.

EXAMPLE 2

A transparent/transluscent overlay composition was produced from the following ingredients, in the following ratio, by volume:

3 parts powdered 80/20 LumiNova® phosphorescent/
fluorescent material;

6 parts epoxy hardener*; and 13 parts epoxy polymer*.

* Materials furnished by Transpo Industries, Inc. of New Rochelle, N.Y.

Once the missing epoxy component was added to the pre-mixture, the resulting composition cured in approximately 30-minutes. The cured, applied composition exhibited a good glow (the glow was significantly superior to the fair glow exhibited in the composition using the ratio of materials specified in Example 1, but not excellent), and exhibited approximately 10 to 12 hours of visibile luminescence. Note that the duration of the composition's visible luminescence does not vary from example to example, because this property was not affected by a decreased proportion of luminescent phosphorescent substance to epoxy.

EXAMPLE 3

A transparent/transluscent overlay composition was produced from the following ingredients, in the following ratio, by volume:

6 parts powdered 80/20 LumiNova® phosphorescent/
fluorescent material;

6 parts epoxy hardener*; and 13 parts epoxy polymer*.

* Materials furnished by Transpo Industries, Inc. of New Rochelle, N.Y.

Once the missing epoxy component was added to the pre-mixture, the resulting composition cured in approximately 30 minutes. The cured, applied composition exhibited an excellent glow (the glow was significantly brighter than that exhibited in the previous ratio), and exhibited approximately 10 to 12 hours of visibile luminescence. Note that the duration of the composition's visible luminescence does not vary from example to example, because this property was not affected by a decreased proportion of luminescent phosphorescent substance to epoxy.

Various ratios of luminescent nmaterial to epoxy resin can be summarized in the following table:

| Parts Lumi-Nova Time | Parts Epoxy* Mixa-bility | Brightness Of Glow | Duration of Glow | Strength | Set | |
|---|---|---|---|---|---|---|
| 5 | 95 | Fair | 10–12 hours | Excellent | 30 min | Excellent |
| 15 | 85 | Good | 10–12 hours | Excellent | 30 min | Good |
| 25 | 75 | Excellent | 10–12 hours | Good | 30 min | Good |
| 50 | 50 | Excellent | 10–12 hours | Fair | 30 min | Fair |

When the compositions are used to overlay markings on highways, roadways, airport runways and other such travelways, it may be desirable to add a reflective property to the compositions, to enhance the visibility of the markings when illuminated by an outside light source, such as automobile headlights. To achieve this reflective property, reflective glass beads (fine glass spheres) are dropped onto the surface of the wet material on the roadway surface manually or by a suitable mechanical device (such as a sprinkler) at the rate of 20 to 25 pounds per gallon of coating. In such an embodiment, the glass beads will therefore be topical on the luminescent epoxy overlay. Insufficient glass bead coverage and/or inadequate glass bead retention are to be avoided. Excessive glass bead coverage is also to be avoided as it would reduce the effective afterglow quality by scattering the energizing light prior to it activating the phosphors. Approximately about ten percent of the reflective beads applied to the painted surface will adhere to the wet surface of the material.

All necessary spray equipment, mixers, compressors and other appurtenances for the placement of the luminescent overlay compositions are well known to those skilled in the art.

When the overlay compositions of the present invention are used to overlay overhead road and shoulder signs, an aggregate, such as fine white marble, could be used in an additive amount in the overlay composition, or topically on the overlay composition, to enhance the wearability of the surface to which it is applied.

It will thus be seen that the objects and advantages set forth above, among those elucidated in, or made apparent from, the preceding descriptions, are efficiently attained in the preferred embodiments. However, since certain changes may be made in the above preferred embodiments without departing from the scope of the invention, it is intended that all matter contained in the above description shall be interpreted as illustrative only and not in a limiting sense. It is also understood that the following claims are intended to cover all of the generic and specific features of the invention herein described, and all statements of the scope of the invention which, as a matter of language, might be said to fall therebetween.

What is claimed is:

1. A phosphorescent-luminescent epoxy overlaying composition, for use in highlighting, during dark or non-daylight conditions, and preserving, and protecting ground surfaces, structure surfaces, article surfaces, or markings on ground, structure or article surfaces, comprising:

(a) a nearly colorless phosphorescent-luminescent material, comprising a compound expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium; and (b) a two-part epoxy (comprising a resin component and a hardener/activator component) that, after curing, is fairly clear, durable, tough, non-aqueous, and moisture stable (insensitive), whereby said overlaying composition, when exposed to a light source, exhibits brightness properties superior to the brightness properties of conventional sulfide phosphorescent materials, and afterglow (i.e., energy deca time period) properties superior to, by exceeding by about ten times, the afterglow properties of conventional sulfide phosphorescent materials.

2. The composition of claim 1 containing europium as a hardener/activator.

3. The composition of claim 2 in which the concentration of the hardener/activator is from about 0.001 mol % to about 10 mol %, the mol % being relative to the metal element expressed by M.

4. The composition of claim 2 containing a co-hardener/activator selected from the group consisting of lanthanium, cerium, praseodymium, neodymium, samarium, gadolinium, terbium, dysprosium, holmium, erbium, thulium, ytterbium, lutetium, manganese, tin and bismuth.

5. The composition of claim 1 containing a fluorescent substance.

6. The composition of claim 1, wherein a concentration range of said phosphorescent-luminescent substance is from about 2% to about 89% by volume of the phosphorescent-luminescent substance and two part epoxy.

7. The composition of claim 1, wherein a more preferred concentration range of said phosphorescent-luminescent substance is from about 5% to about 50% by volume of the phosphorescent-luminescent substance and two part epoxy.

8. The composition of claim 1, wherein a most preferred concentration range of said phosphorescent-luminescent substance is from about 15% to about 40% by volume of the phosphorescent-luminescent substance and two part epoxy.

9. The composition of claim 1, further including an abrasive particulate material selected from the group consisting of a natural abrasive material and a synthetic abrasive material and mixtures thereof.

10. A method of preparing (or "pre-mixing") a phosphorescent-luminescent epoxy overlay composition for use in highlighting, during dark or non-daylight conditions, and preserving, and protecting ground surfaces and markings on ground surfaces and articles, whereby incremental amounts of the phosphorescent-luminescent substance are mixed with either the hardener component or the resin/activator component of the two-part epoxy before mixing together and activating the two epoxy components, thus assuring that the phosphorescent-luminescent powder particles are thoroughly coated, encapsulated and homogeneously distributed throughout the hardener component or the resin/activator component of the two-part epoxy, prior to mixing together the two epoxy components.

11. A method of mixing the phosphorescent-luminescent epoxy overlay composition of any one of claims 1–9, whereby, when the user is ready to apply the phosphorescent-luminescent epoxy overlay composition to the desired ground surfaces, structure surfaces, article surfaces, or markings on ground, structure or article surfaces, the pre-mixture of claim 10 is mixed with the remaining epoxy component (the hardener component or the resin/activator component of the two-part epoxy), such that the composition can be then applied immediately to the ground, structure or article surface using conventional application means before said epoxy overlay composition.

12. The method according to claim 10, the pre-mixing of said phosphorescent-luminescent substance and either the hardener component or the resin/activator component of the two-part epoxy, whereby the pre-mixing may be performed under controlled industrial or factory plant conditions.

13. The method according to claim 11, the mixing of the pre-mixture of claim 10 with the remaining epoxy component (the hardener component or the resin/activator component of the two-part epoxy), whereby the mixing may be performed on site at/on which said phosphorescent-luminescent epoxy overlay composition is to be applied.

* * * * *